US 8,406,468 B2

(12) United States Patent
Lee et al.

(10) Patent No.: US 8,406,468 B2
(45) Date of Patent: Mar. 26, 2013

(54) IMAGE CAPTURING DEVICE AND METHOD FOR ADJUSTING A POSITION OF A LENS OF THE IMAGE CAPTURING DEVICE

(75) Inventors: Hou-Hsien Lee, Taipei Hsien (TW); Chang-Jung Lee, Taipei Hsien (TW); Chih-Ping Lo, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 521 days.

(21) Appl. No.: 12/764,920

(22) Filed: Apr. 21, 2010

(65) Prior Publication Data
US 2011/0228977 A1 Sep. 22, 2011

(30) Foreign Application Priority Data
Mar. 18, 2010 (CN) .................. 2010 1 0127201

(51) Int. Cl.
*G06K 9/00* (2006.01)
(52) U.S. Cl. ..................... 382/103; 382/107; 348/155
(58) Field of Classification Search .................. 382/103, 382/107, 118, 255; 348/143, 155, 169
See application file for complete search history.

(56) References Cited

U.S. PATENT DOCUMENTS

| 7,536,028 B2 * | 5/2009 | Sumitomo .................. 382/103 |
| 2002/0015094 A1 * | 2/2002 | Kuwano et al. ............... 348/143 |
| 2006/0126737 A1 * | 6/2006 | Boice et al. ............... 375/240.16 |
| 2007/0030896 A1 * | 2/2007 | Comaniciu et al. ...... 375/240.08 |
| 2009/0091633 A1 * | 4/2009 | Tamaru .................. 348/208.14 |
| 2009/0135291 A1 * | 5/2009 | Sugimoto .................. 348/347 |
| 2009/0196461 A1 * | 8/2009 | Iwamoto .................. 382/103 |

* cited by examiner

*Primary Examiner* — Andrew W Johns
(74) *Attorney, Agent, or Firm* — Altis Law Group, Inc.

(57) ABSTRACT

A method for adjusting a position of a lens of an image capturing device obtains a plurality of images of a monitored scene by the lens, detects a motion area in the monitored scene, and detects if a human face is in the motion area. The method further moves the lens according to movement data of the human face if the human face is detected, or moves the lens according to movement data of the motion area if the human face is not detected.

12 Claims, 4 Drawing Sheets

IMAGE CAPTURING DEVICE AND METHOD FOR ADJUSTING A POSITION OF A LENS OF THE IMAGE CAPTURING DEVICE

BACKGROUND

1. Technical Field

Embodiments of the present disclosure relate to security surveillance technology, and particularly to an image capturing device and method for adjusting a position of a lens of the image capturing device.

2. Description of Related Art

Currently, image capturing devices have been used to perform security surveillance by capturing images of monitored scenes, and sending the captured images to a monitoring computer. However, a position of a lens of the image capturing device cannot be changed according to movement of an object in the monitored scene. Therefore, an efficient method for adjusting a position of the lens of the image capturing device is desired.

DETAILED DESCRIPTION

All of the processes described below may be embodied in, and fully automated via, functional code modules executed by one or more general purpose computers or processors. The code modules may be stored in any type of readable medium or other storage device. Some or all of the methods may alternatively be embodied in specialized hardware. Depending on the embodiment, the readable medium may be a hard disk drive, a compact disc, a digital video disc, or a tape drive.

Figure 1:
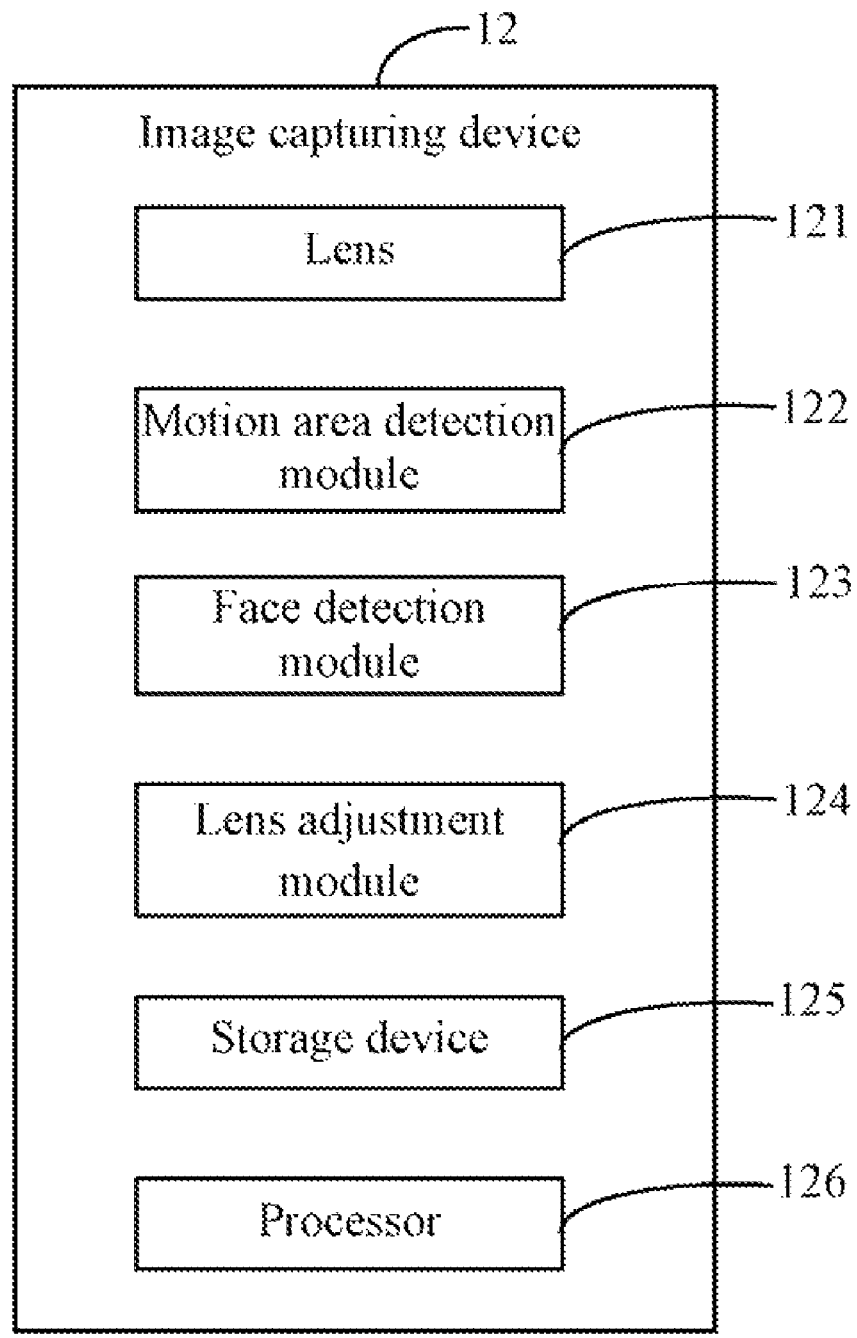
FIG. 1 is a block diagram of one embodiment of an image capturing device.

FIG. 1 is a block diagram of one embodiment of an image capturing device 12. In one embodiment, the image capturing device 12 includes a lens 121, a motion area detection module 122, a face detection module 123, a lens adjustment module 124, a storage device 125, and a processor 126. In one embodiment, the modules 122-124 comprise one or more computerized instructions that are stored in the storage device 125. The processor 126 executes the computerized instructions to implement one or more operations of the image capturing device 12. In one embodiment, the image capturing device 12 may be a speed dome camera or pan/tilt/zoom (PTZ) camera, for example. The image capturing device 12 may be used to adjust a position of the lens 121 when a moving object is detected in a monitored scene. A detailed description will be given in the following paragraphs.

The lens 121 obtains a plurality of images of the monitored scene. In one embodiment, the lens 121 may be a charge coupled device (CCD). The monitored scene may be a warehouse or other important places.

The motion area detection module 122 detects a motion area in the monitored scene. In one embodiment, the motion area is regarded as a moving object in the monitored scene. A detailed description is provided as follows. First, the motion area detection module 122 obtains a first image of the monitored scene at a first time from the plurality of images, and calculates characteristic values of the first image. Second, the motion area detection module 122 obtains a second image of the monitored scene at a second time continuous with the first time, and calculates the characteristic values of the second image. Third, the motion area detection module 122 matches the first image and the second image via an autocorrelation of the characteristic values of the first image and the second image, to obtain a corresponding area in both of the first image and the second image. Fourth, the motion area detection module 122 compares the characteristic values of the corresponding area in both of the first image and the second image, to obtain a motion area of the monitored scene, with different characteristic values of the corresponding area in the first image and the second image.

The face detection module 123 detects a human face in the motion area. In one embodiment, the face detection module 123 detects a human face using a skin color model in YCbCr space or a face template matching method.

If the human face is detected, the lens adjustment module 124 obtains movement data of the lens 121 according to movement data of the human face. In one embodiment, the movement data may include, but are not limited to, a movement direction, a movement angle, and a movement distance. For example, the lens adjustment module 124 determines that the movement direction of the lens 121 is left if the movement direction of human face is left, or determines that the movement direction of the lens 121 is right if the movement direction of the human face is right.

If the human face is not detected, the lens adjustment module 124 obtains movement data of the lens 121 according to movement data of the motion area.

The lens adjustment module 124 adjusts a position of the lens 121 according to the movement data of the lens 121. A detailed description is provided as follows.

Figure 2:
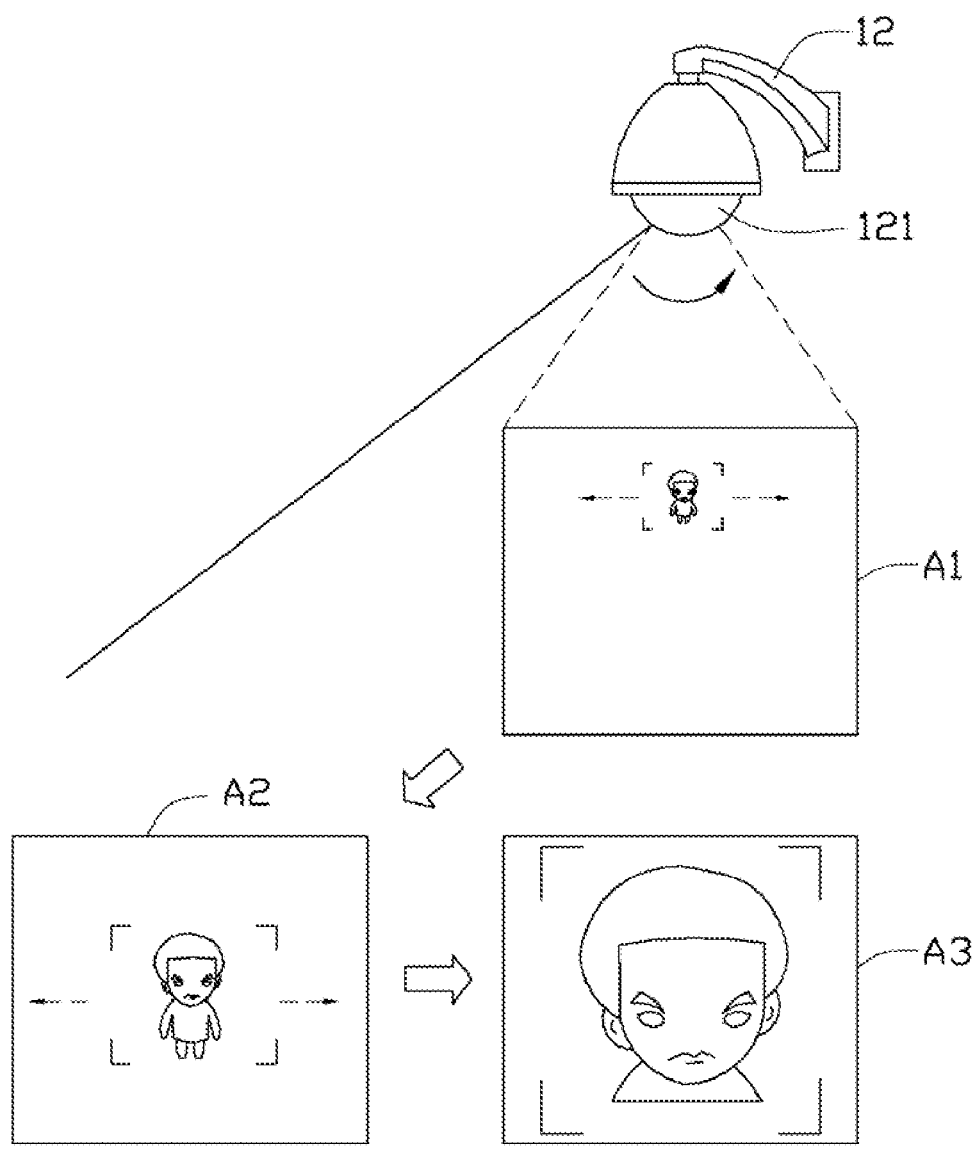
FIG. 2 is a schematic diagram of one embodiment of images captured by the image capturing device if a face is detected.

If the human face is detected, the lens adjustment module 124 moves the lens 121 with the movement data of the human face to focus the lens 121 on the human face, and zooms in a focal length of the lens 121. Referring to FIG. 2, "A1" represents an image of the monitored scene captured by the lens 121 when a person is immovable, "A2" represents an image of the monitored scene captured by the lens 121 when the person is movable, and "A3" represents an image of the monitored scene captured by the lens 121 when the lens 121 is adjusted according to the movement data of the human face of the person.

Figure 3:
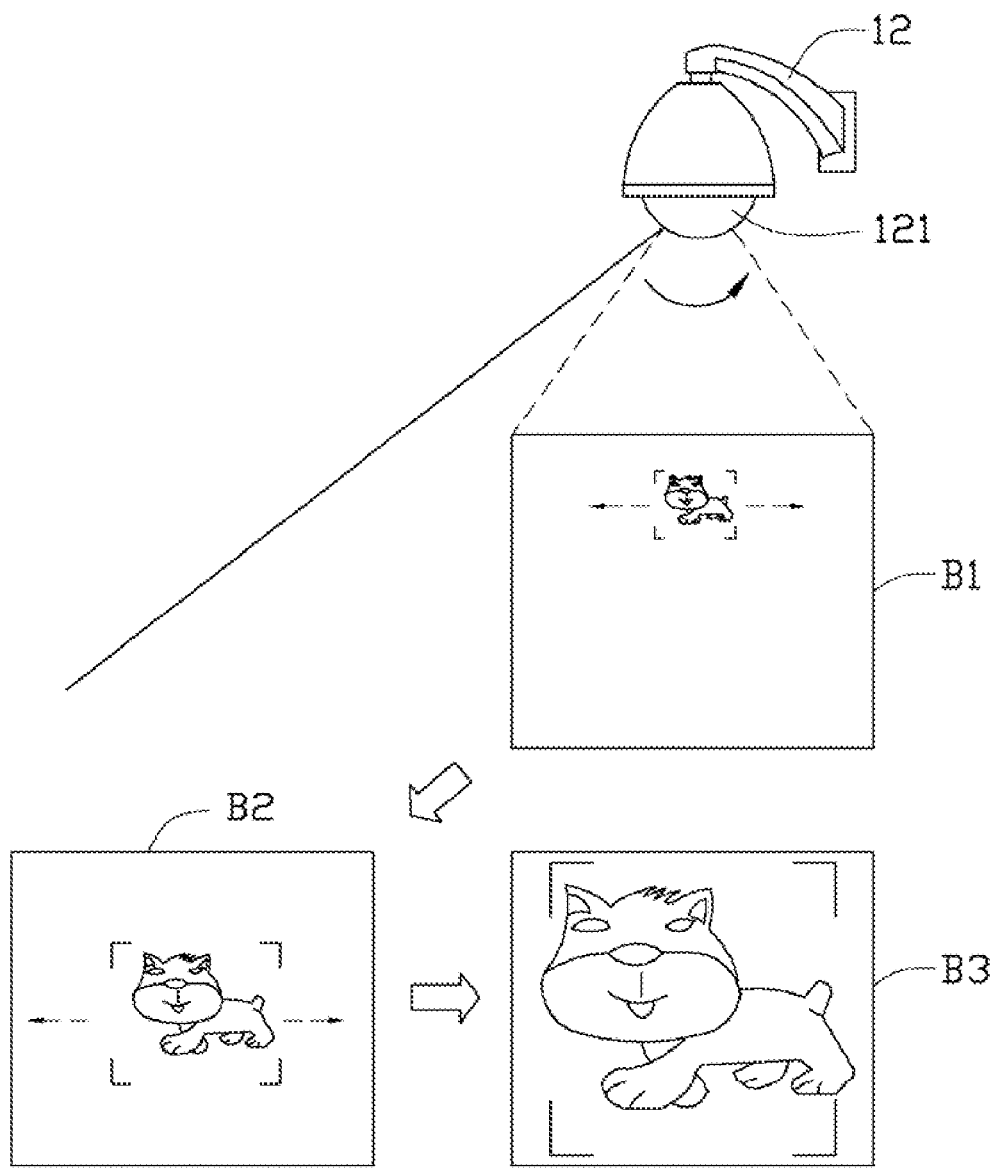
FIG. 3 is a schematic diagram of one embodiment of images captured by the image capturing device if a face is not detected.

If the human face is not detected, the lens adjustment module 124 moves the lens with the movement data of the motion area to focus the lens on the motion area, and zooms in the focal length of the lens. Referring to FIG. 3, "B1" represents an image of the monitored scene captured by the lens 121 when a dog is immovable, "B2" represents an image of the monitored scene captured by the lens 121 when the dog is movable, and "B3" represents an image of the monitored scene captured by the lens 121 when the lens 121 is adjusted according to the movement data of the dog.

Figure 4:
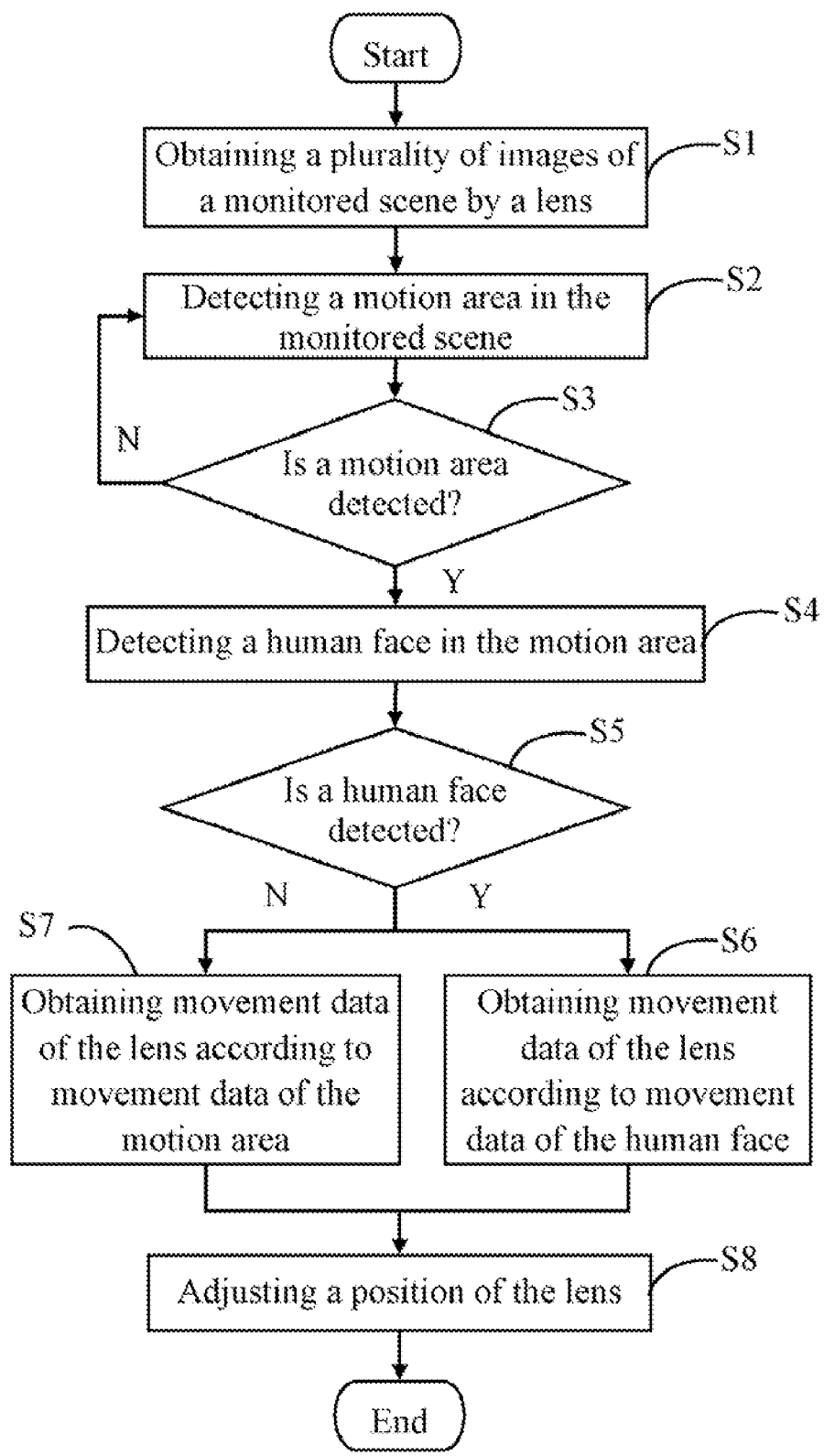
FIG. 4 is a flowchart of one embodiment of a method for adjusting a position of a lens of the image capturing device.

FIG. 4 is a flowchart of one embodiment of a method for adjusting a position of the lens 121 of the image capturing device 12. Depending on the embodiment, additional blocks may be added, others removed, and the ordering of the blocks may be changed.

In block S1, the lens 121 obtains a plurality of images of a monitored scene.

In block S2, the motion area detection module 122 detects a motion area in the monitored scene. A detailed description refers to paragraph [0010].

In block S3, the motion area detection module 122 determines if a motion area is detected in the monitored scene. If a motion area is detected in the monitored scene, the procedure goes to block S4. If a motion area is not detected in the monitored scene, the procedure returns to block S2.

In block S4, the face detection module 123 detects a human face in the motion area. In one embodiment, the human face detection module 123 detects a human face using a skin color model in YCbCr space or a human face template matching method.

In block S5, the face detection module 123 determines if a human face is detected in the motion area. If a human face is detected in the motion area, the procedure goes to block S6. If a human face is not detected in the motion area, the procedure goes to block S7.

In block S6, the lens adjustment module 124 obtains movement data of the lens 121 according to movement data of the human face. In one embodiment, the movement data may include a movement direction, a movement angle, and a movement distance.

In block S7, the lens adjustment module 124 obtains movement data of the lens 121 according to movement data of the motion area.

In block S8, the lens adjustment module 124 adjusts a position of the lens 121 according to the movement data of the lens 121. If the human face is detected, the lens adjustment module 124 moves the lens 121 with the movement data of the human face to focus the lens 121 on the human face, and zooms in a focal length of the lens 121. If the human face is not detected, the lens adjustment module 124 moves the lens with the movement data of the motion area to focus the lens on the motion area, and zooms in the focal length of the lens.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An image capturing device, comprising:
   a lens operable to obtain a plurality of images of a monitored scene;
   a motion area detection module operable to detect a motion area in the monitored scene;
   a face detection module operable to detect a human face in the motion area; and
   a lens adjustment module operable to move the lens according to movement data of the human face if the human face is detected, or move the lens according to movement data of the motion area if the human face is not detected.

2. The image capturing device according to claim 1, wherein the motion area detection module detects the motion area in the monitored scene by:
   obtaining a first image of the monitored scene at a first time from the plurality of images, and calculating characteristic values of the first image;
   obtaining a second image of the monitored scene at a second time continuous with the first time, and calculating the characteristic values of the second image;
   matching the first image and the second image via an autocorrelation of the characteristic values of the first image and the second image, to obtain a corresponding area in both of the first image and the second image; and
   comparing the characteristic values of the corresponding area in both of the first image and the second image, to obtain a motion area of the monitored scene, with different characteristic values of the corresponding area in the first image and the second image.

3. The image capturing device according to claim 1, wherein the movement data comprises a movement direction, a movement angle, and a movement distance.

4. The image capturing device according to claim 3, wherein the lens adjustment module moves the lens according to movement data of the human face if the human face is detected, or moves the lens according to movement data of the motion area if the human face is not detected by:
   moving the lens according to the movement data of the human face to focus the lens on the human face if the human face is detected, and zooming in a focal length of the lens; or
   moving the lens according to the movement data of the motion area to focus the lens on the motion area if the human face is not detected, and zooming in the focal length of the lens.

5. A method for adjusting a position of a lens of an image capturing device, comprising:
   obtaining a plurality of images of a monitored scene by the lens;
   detecting a motion area in the monitored scene;
   detecting if a human face is in the motion area; and
   moving the lens according to movement data of the human face if the human face is detected, or moving the lens according to movement data of the motion area if the human face is not detected.

6. The method according to claim 5, wherein the step of detecting the motion area in the monitored scene comprises:
   obtaining a first image of the monitored scene at a first time from the plurality of images, and calculating characteristic values of the first image;
   obtaining a second image of the monitored scene at a second time continuous with the first time, and calculating the characteristic values of the second image;
   matching the first image and the second image via an autocorrelation of the characteristic values of the first image and the second image, to obtain a corresponding area in both of the first image and the second image; and
   comparing the characteristic values of the corresponding area in both of the first image and the second image, to obtain a motion area of the monitored scene, with different characteristic values of the corresponding area in the first image and the second image.

7. The method according to claim 5, wherein the movement data comprises a movement direction, a movement angle, and a movement distance.

8. The method according to claim 7, wherein the step of moving the lens according to movement data of the human face if the human face is detected, or moving the lens according to movement data of the motion area if the human face is not detected comprises:
   moving the lens according to the movement data of the human face to focus the lens on the human face if the human face is detected, and zooming in a focal length of the lens; or
   moving the lens according to the movement data of the motion area to focus the lens on the motion area if the human face is not detected, and zooming in the focal length of the lens.

9. A non-transitory storage medium having stored thereon instructions that, when executed by a processor of an image capturing device, causes the processor to perform a method for adjusting a position of a lens of the image capturing device, the method comprising:

obtaining a plurality of images of a monitored scene by the lens;

detecting a motion area in the monitored scene;

detecting if a human face is in the motion area; and moving the lens according to movement data of the human face if the human face is detected, or moving the lens according to movement data of the motion area if the human face is not detected.

10. The non-transitory storage medium according to claim 9, wherein the step of detecting the motion area in the monitored scene comprises:

obtaining a first image of the monitored scene at a first time from the plurality of images, and calculating characteristic values of the first image;

obtaining a second image of the monitored scene at a second time continuous with the first time, and calculating the characteristic values of the second image;

matching the first image and the second image via an autocorrelation of the characteristic values of the first image and the second image, to obtain a corresponding area in both of the first image and the second image; and comparing the characteristic values of the corresponding area in both of the first image and the second image, to obtain a motion area of the monitored scene, with different characteristic values of the corresponding area in the first image and the second image.

11. The non-transitory storage medium according to claim 9, wherein the movement data comprises a movement direction, a movement angle, and a movement distance.

12. The non-transitory storage medium according to claim 11, wherein the step of moving the lens according to movement data of the human face if the human face is detected, or moving the lens according to movement data of the motion area if the human face is not detected comprises:

moving the lens according to the movement data of the human face to focus the lens on the human face if the human face is detected, and zooming in a focal length of the lens; or moving the lens according to the movement data of the motion area to focus the lens on the motion area if the human face is not detected, and zooming in the focal length of the lens.

\* \* \* \* \*